Jan. 3, 1956 C. K. RAYNSFORD ET AL 2,729,103
MEANS FOR REJECTING NO-FLOW SIGNALS IN A FLOWMETER
Filed May 16, 1952

INVENTORS
CHARLES K. RAYNSFORD
RUDOLPH W. BUNTENBACH
BY
Mitchell & Bechert
ATTORNEYS

United States Patent Office 2,729,103
Patented Jan. 3, 1956

---

2,729,103

MEANS FOR REJECTING NO-FLOW SIGNALS IN A FLOWMETER

Charles K. Raynsford and Rudolph W. Buntenbach, Summit, N. J., assignors to Vitro Corporation of America, New York, N. Y., a corporation of Delaware Application May 16, 1952, Serial No. 288,127

13 Claims. (Cl. 73—194)

Our invention relates to a magnetic induction flowmeter of the type in which flow is measured by observing the voltage induced across a flow tube in the presence of a magnetic field.

When exciting a magnetic-induction flowmeter with alternating current, there results what may be called a no-flow signal which is out of phase with signals attributable to the flow of fluid in the flow tube. These and other spurious signals may include substantial components out of phase with the flow-induced signal.

It is an object of the invention to provide an improved flowmeter of the character indicated.

It is another object to provide an improved flowmeter with means for rejecting signals out of phase with the desired flow-induced signal.

It is a further object to provide means for eliminating, or at least for reducing to insubstantial proportions, the no-flow signal observed in flowmeters excited with an alternating field.

It is also an object to provide improved means for increasing the signal-to-noise ratio and for thereby extending the lower limit of operation in flowmeters of the character indicated.

It is a general object to meet the above objects with a construction which is basically simple and which is efficient from the standpoint of power consumption.

Other objects and various further features of novelty and invention will be pointed out, or will occur to those skilled in the art from a reading of the following specification in conjunction with the accompanying drawings. In said drawings, which show, for illustrative purposes only, preferred forms of the invention:

Briefly stated, our invention contemplates the employment of synchronous-rectifier or phase-sensitive detector means for discriminating against signals picked up by the electrode circuit of the flowmeter, but out of phase with the desired flow-induced signal. In one form to be described, we employ mechanical switching means as the synchronous rectifier or phase-sensitive detector, and such switching means is run in synchronism with excitation of the magnetic field in which the electrodes are placed. By adjusting the phase relation between the mechanical switch and the applied excitation, one may select the flow-induced voltage substantially to the exclusion of signals out of phase therewith, and signals in quadrature-phase relation with the flow-induced voltage are substantially reduced, or are completely eliminated. In the other form to be described, operation is purely electronic, but the same discrimination against signals of unwanted phase is achieved.

Figure 1:
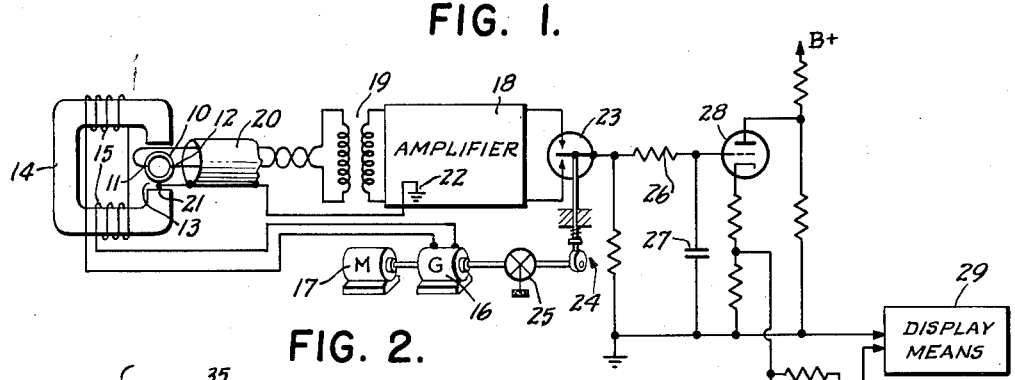
Fig. 1 is a simplified electrical diagram schematically showing one application of our invention to a magnetic-induction flowmeter.

Referring to the drawings, we show in Fig. 1 a magnetic-induction flowmeter including a flow tube 10 with spaced electrodes 11—12 at a probing section. The probing section is located in the gap 13 of magnetic excitation means, including a core 14 and excitation windings 15. The windings 15 are excited by an alternating-current source, which we have shown as a generator 16 driven by motor means 17.

The flow-induced voltage, as well as undesired signal components, will appear across the electrodes 11—12, and we feed this voltage to signal-processing means, including an amplifier 18, through coupling means such as transformer 19. We prefer that the leads to the transformer 19 shall be shielded, as suggested at 20, and that grounding means (designated generally 21) for the flow tube be directly connected to the shield 20; the potential of shield 20 may be tied to a neutral point in the amplifier means 18, as suggested at 22.

In accordance with the invention, we provide synchronous-rectifier or phase-sensitive detector means for discriminating against signals of unwanted phase as such signals appear across the electrodes 11—12. In the form shown, we locate such discriminating means at the output of amplifier means 18, and we employ a mechanical switch 23, oscillating between opposite poles of the output of amplifier 18, in synchronism with the magnetic excitation means. Since the switch 23 is mechanically operated, it is convenient to run the switch 23 by means of a direct connection to the shaft of generator 16, as suggested by the cam and follower elements 24. In order to facilitate adjustment of the phase of operation of switch 23 with respect to the phase of the flow-induced voltage, we provide phase-adjustment means, which may be located in the line between generator 16 and windings 15, but which we have shown as manually adjustable differential gearing 25, between the generator 16 and cam means 24. The output of the mechanical rectifier 23 may be smoothed by resistance-capacitance means 26—27 and amplified at 28 for supply to display means 29, such as a recorder or meter.

Figure 2:
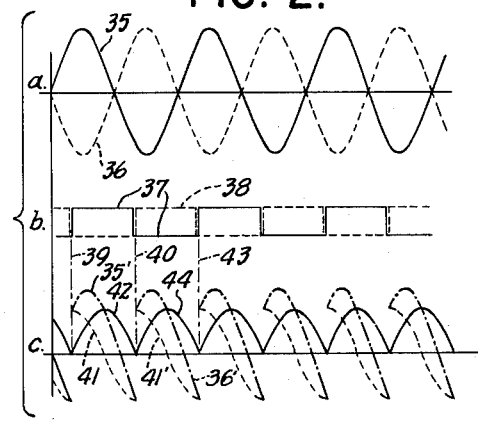
Fig. 2 is a collection of graphs on the same time scale, and illustrating synchronization of functions in the arrangement of Fig. 1.

The operation of our device will be more clear from a consideration of the graphical presentation of Fig. 2. The curves of Fig. 2a illustrate, at solid line 35, the signal appearing at one pole of the output of amplifier 18 with respect to ground, while the dotted-line curve 36 represents the corresponding signal at the other pole of the output of amplifier 18.

It will be appreciated that both signals 35 and 36 may contain out-of-phase components, which are not desired. Since the switch 23 is either on or off at one or the other pole at substantially all times, its operation may be viewed as an interlaced succession of square waves, as indicated generally at 37—38, respectively. With a proper adjustment of the phase-shifting means 35, contact of the switch 23 with one pole of the output of amplifier 18, say the upper pole, may commence at an instant 39 substantially coincident with reversal of polarity in the flow-induced voltage. The same contact will be maintained until the next reversal of polarity, substantially at the instant 40. During the interval 39—40, the rectifier 23 will sample only the portion 35' of the voltage 35, but this portion 35' contains a component of undesired phase, such as the component 41 in phase quadrature with the flow-induced voltage. This quadrature-phase component 41 will be seen as having an average magnitude of zero during the sampling interval 39—40, so that the output of rectifier means 23 for the sampling interval 39—40 will be the wave 42 representing the flow-induced voltage over this period of time.

For the next sampling interval 40—43, wherein the switch 23 samples the other polarity of output from amplifier means 18, the rectifier will only sample the portion 36' of the voltage, but this portion 36' contains the quadrature-phase component 41', having an average value of zero during the sampling interval. As a result, the out-of-phase component is discriminated against, and in the interval 40—43 the rectifier 23 will present an output signal 44 reflecting the flow-induced voltage, or at least substantially only signals in phase therewith. The action of filtering means 26—27 may be to convert the signals 42—44 into a smoothed direct current of magnitude corresponding to that of the flow-induced voltage, as will be understood.

Figure 3:
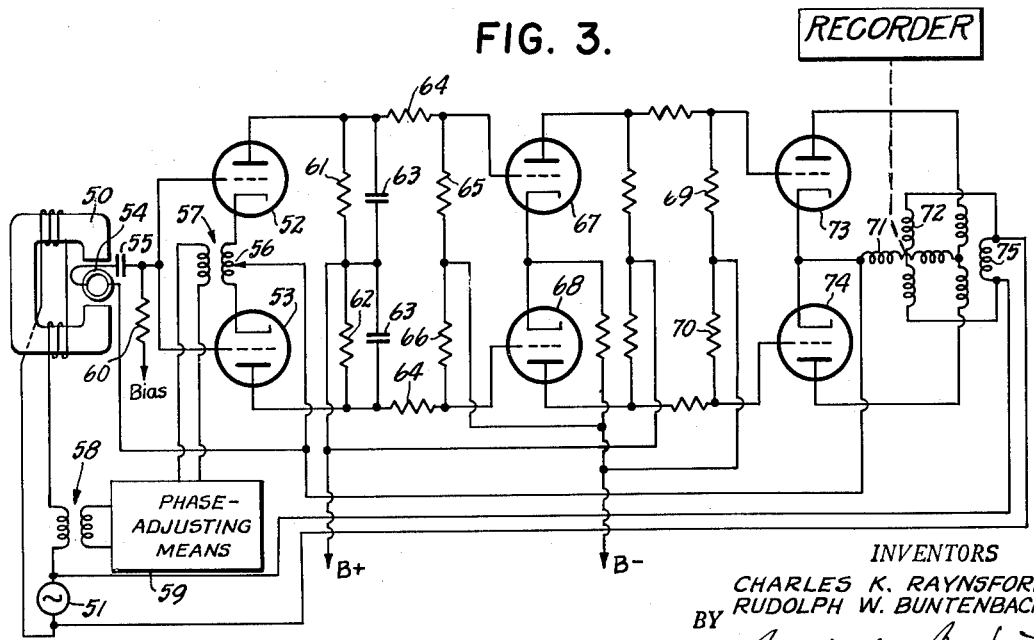
Fig. 3 is an electrical diagram illustrating another embodiment.

In Fig. 3, we show an alternative arrangement employing all-electronic elements in place of the mechanical synchronous rectifier or phase-sensitive detector 23 of Fig. 1. In Fig. 3, the magnetic means 50 is excited by an alternating source 51, which is common also to a push-pull phase-sensitive amplifier 52—53. The amplifier 52—53 is shown to include two separate triodes, which may be halves of a twin triode.

The flow-induced voltage, and any other spurious signals including undesired out-of-phase components appearing across the electrodes of flow tube 54, may be applied through capacitance 55 in balanced relation to the control circuits of amplifier means 52—53. This is shown to includes a connection of one electrode to the grids of tubes 52—53, and a connection of the other electrode to a neutral point of the phase-sensitive detector, as at the mid-point 56 of the secondary of transformer 57 through which the synchronizing voltage is applied to the phase-sensitive detector. The secondary of transformer 57 is shown connecting the cathodes of tubes 52—53, and the primary is directly coupled to the magnetic excitation means for the flow tube 54, as through transformer means 58. This latter connection may include the phase-adjusting means 59 for assuring that the discrimination will be against signals out of phase with the flow-induced voltage.

The operation of the phase-sensitive detector 52—53 is biased at 60 to give half-wave rectification across the respective outputs 61—62 of the separate halves of the detector. The total output across 61—62 then becomes the difference in potential of the two individual outputs, and by means of filtering elements 63—64 there appears across resistors 65—66 a smoothed direct current of magnitude proportional to the flow-signal input. The polarity of the total output (across 65—66) reverses with phase reversal in the signal. Input voltage in quadrature with the signal produces identical output in each half of the detector, so that the difference or total output is zero for quadrature voltages of any magnitude. Other spurious-signal components out of phase with the flow-induced voltage, but not in quadrature therewith, will be discriminated against so that signal-to-noise, as far as these other components are concerned, is nevertheless improved.

Under certain circumstances, high values of individual output voltage, that is, voltage appearing across resistor 65 or voltage appearing across resistor 66, may tend to overload the signal-processing circuits, resulting in a condition of paralysis. To avoid such paralysis, we prefer to feed the phase-senstive detector output (appearing across resistors 65 and 66) into a direct-current difference amplifier 67—68; amplifier 67—68 produces an output, appearing across resistors 69—70, proportional to the difference in potential of the individual halves of the output of the phase-sensitive detector, regardless of the absolute magnitude of these halves.

For display purposes, as for operating a recorder, we may employ a two-phase motor with two windings 71—72, one of which is driven by modulator means 73—74, having control circuits supplied by the voltage across resistors 69—70. The two-phase motor may be excited by a reference voltage appearing in a transformer winding 75 fed by the same source 51 as the magnetic excitation means. This voltage is shown directly exciting the winding 72 of motor means 71—72, and it may also control (through the secondary of transformer 75) the alternate switching functions of the respective halves of modulator means 73—74, with the result that the motor means 71—72 rotates in a direction and with a speed proportional to the polarity and magnitude of the D.-C. signal furnished by the difference amplifier.

It will be understood that the described circuits may form part of a servo loop, as disclosed in greater detail in the copending application of A. R. Soffel, Serial No. 283,328, filed April 21, 1952. In such a system, feedback voltage may be derived from a potentiometer pick-off driven by motor means 71—72 and applied, by means not shown, between the electrodes and the amplifier means 51—52. It will be appreciated that our present circuits are particularly adapted to such a servomechanism, because phase-correcting networks necessary to achieve servo stability and to control bandwidth may be readily inserted as capacitances in the D.-C. biasing circuits between stages.

It will be seen that we have devised an effective means for discriminating against signals of unwanted phase in flowmeters of the character indicated. Most of these spurious signals have been found to be in quadrature with the flow-induced voltage, and for such quadrature-phase components complete rejection may be achieved. Operation with the mechanical phase-sensitive detector of Fig. 1 may be entirely satisfactory, but the electronic synchronous rectifier does offer the advantage of utilizing ordinary vacuum tubes or equivalent amplifying devices, without requiring mechanically moving parts or other special devices. Furthermore, in the electronic embodiment, each stage, in addition to performing its special function, contributes significantly to the over-all gain of the particular servo loop in which the circuits may be embodied, thereby improving efficiency from the standpoint of power consumption.

While we have described our invention in detail for the preferred forms shown, it will be understood that modifications may be made within the scope of the invention, as defined in the claims which follow.

We claim:

1. In a flowmeter, a flow tube including spaced electrodes at a probing section, magnetic excitation means having a gap at said probing section, and signal-processing means coupled to said electrodes and including synchronous-rectifier means synchronized with said magnetic excitation means.

2. A flowmeter according to claim 1, in which said rectifier means includes mechanically movable rectifying elements.

3. A flowmeter according to claim 1, in which said rectifier means includes phase-sensitive electronic components.

4. In a flowmeter, a flow tube including spaced electrodes at a probing section, magnetic excitation means having a gap at said probing section, phase-sensitive detector means coupled to said electrodes, and means synchronizing said phase-sensitive detector means with said magnetic excitation means.

5. In a flowmeter, a flow tube including spaced electrodes at a probing section, a magnet having a gap at said probing section, phase-sensitive detector means coupled to said electrodes, and common excitation means for said magnet and for said phase-sensitive detector means.

6. In a flowmeter, a flow tube including spaced electrodes at a probing section, magnet means having a gap at said probing section, phase-sensitive detector means coupled to said electrodes, common excitation means for said magnet means and for said phase-sensitive detector means, and adjustable phase-shifting means between said common excitation means and one of said magnet and phase-sensitive detector means.

7. A flowmeter according to claim 6, in which said common excitation means includes a generator, and means for driving said generator.

8. A flowmeter according to claim 7, in which said phase-sensitive detector means is mechanically operated by a connection to the shaft of said generator means, and in which said connection includes differential gearing.

9. In a flowmeter, a flow tube including spaced electrodes at a probing section, magnetic excitation means having a gap at said probing section, signal-processing means coupled to said electrodes and including phase-sensitive detector means, and a synchronizing connection for said phase-sensitive detector means and including pick-off means inductively related to said magnetic excitation means.

10. A flowmeter according to claim 9, in which said synchronizing connection includes phase-adjusting means.

11. In a flowmeter, a flow tube including spaced electrodes at a probing section, magnetic excitation means having a gap at said probing section, signal-processing means coupled to said electrodes and including phase-sensitive detector means synchronized with said magnetic excitation means, a two-phase motor including two windings for connection to a source of alternating current, and phase-reversing means for reversing the phase of excitation to one of said windings and including modulator means driven by said phase-sensitive detector means.

12. A flowmeter according to claim 11, in which said phase-sensitive detector means is a push-pull connected amplifier.

13. A flowmeter according to claim 12, and including D. C. difference-amplifier means differentially responsive to the outputs of the respective halves of said push-pull connected amplifier.

References Cited in the file of this patent

UNITED STATES PATENTS

| 2,389,692 | Sherwin | Nov. 27, 1945 |
| 2,429,636 | McCoy | Oct. 8, 1947 |
| 2,440,600 | Crosby | Apr. 27, 1948 |

OTHER REFERENCES

An Induction Flowmeter Design Suitable for Radioactive Liquid, by W. G. James, in The Review of Scientific Instruments, vol. 22, No. 12, December 1951.